US004001613B2

United States Statutory Invention Registration [19]

[11] Reg. Number: H1613

Espy

[45] Published: Nov. 5, 1996

[54] POLYAMIDE-EPICHLOROHYDRIN WET-STRENGTH RESINS WITH REDUCED CONTENT OF EPICHLOROHYDRIN-DERIVED BY-PRODUCTS IN-SITU SOLVENT EXTRACTION

[75] Inventor: Herbert H. Espy, Wilmington, Del.

[73] Assignee: Hercules Incorporated, Wilmington, Del.

[21] Appl. No.: 264,804

[22] Filed: Jun. 23, 1994

Related U.S. Application Data

[63] Continuation of Ser. No. 96,388, Jul. 26, 1993, abandoned.

[51] Int. Cl.[6] ..... C08F 6/10

[52] U.S. Cl. ..... 528/489; 524/608; 525/430; 528/488

[58] Field of Search ..... 524/608; 162/164.3, 162/164.6

[56] References Cited

U.S. PATENT DOCUMENTS

| | | | |
|---|---|---|---|
| 3,655,506 | 4/1972 | Baggett | 162/164.3 |
| 3,947,383 | 3/1976 | Baggett | 162/168.5 |
| 4,222,921 | 9/1980 | Van Eenam | 524/812 |
| 4,975,499 | 12/1990 | Bachem | 525/430 |
| 5,017,642 | 5/1991 | Hasegawa | 524/608 |
| 5,019,606 | 5/1991 | Marten | 523/414 |
| 5,079,019 | 1/1992 | Hirsbrunner et al. | 426/429 |
| 5,189,142 | 2/1993 | Devore | 528/339.3 |
| 5,239,047 | 8/1993 | Devore | 524/414 |
| 5,256,727 | 10/1993 | Dulany | 524/608 |

*Primary Examiner*—Charles T. Jordan
*Assistant Examiner*—J. R. Hardee
*Attorney, Agent, or Firm*—Ivan G. Szanto

[57] ABSTRACT

A process for reducing the concentration of epichlorohydrin by-products in the manufacture of polyamide-epichlorohydrin resins, comprising reacting polyaminopolyamide prepolymer in aqueous solution with epichlorohydrin and an immiscible solvent for the epichlorohydrin, continuing the reaction of the prepolymer with the epichlorohydrin to produce the desired viscosity of the aqueous phase, stabilizing the resin product by diluting or acidifying the aqueous phase, separating the solvent from the aqueous resin, and treating the solvent phase with caustic to convert epichlorohydrin by-products to epichlorohydrin for recycling.

21 Claims, No Drawings

POLYAMIDE-EPICHLOROHYDRIN WET-STRENGTH RESINS WITH REDUCED CONTENT OF EPICHLOROHYDRIN-DERIVED BY-PRODUCTS IN-SITU SOLVENT EXTRACTION

This application is a continuation of application Ser. No. 08/096,388 filed Jul. 26, 1993, abandoned.

This invention relates to the manufacture of polyaminopolyamide-epichlorohydrin wet-strength resins by reacting polyamino-polyamide prepolymer in aqueous solution with epichlorohydrin.

BACKGROUND OF INVENTION

Polyaminopolyamide-epichlorohydrin wet-strength resins contain significant amounts of chloro-alcohols derived from side reactions of epichlorohydrin. Not being cationic polymers, these chloro-alcohols are not retained on paper pulp as are the cationic polymeric wet-strength resins. They remain largely in the water and enter the environment principally through mill waste water. There is concern about organic chloride compounds entering the environment in such effluents from industrial processes.

In the conventional manufacture of polyaminopolyamide-epichlorohydrin ("polyamide-epi") wet-strength resins, prepolymer in aqueous solution is reacted with epichlorohydrin (epi) at between about 20° C. and 85° C., more typically between about 50 C. and 80° C., to produce the desired solution viscosity, and the solution is diluted and/or acidified to stabilize the resin product.

Not all of the epi in the aqueous reaction mixture reacts with amine groups to functionalize the polymer; some of the epi reacts with water to form 3-chloropropane-1,2-diol ("CPdiol"), and some epi reacts with chloride ion to form dichloro-2-propanol (DCP), normally a mixture of 1,3-dichloro-2-propanol and 2,3- -dichloro-1-propanol, both of which are toxic by-products. Furthermore, the formation of DCP lowers the effective utilization of epichlorohydrin to form polyamide-epichlorohydrin resin.

It is known to recover the DCP and reconvert it to epi for recycle by repeated batch extraction or counter-current extraction of the resin solution, but these procedures are expensive and may not be cost-effective.

It would be desirable to have a cost-effective process for substantially reducing the concentration of epichlorohydrin and its by-products in polyamide-epichlorohydrin resin solutions.

SUMMARY OF THE INVENTION

The invention comprises the steps of reacting polyaminopolyamide prepolymer in aqueous solution with epichlorohydrin in the presence of a water-immiscible solvent for the epichlorohydrin, continuing the reaction of the prepolymer with the epichlorohydrin to produce the desired viscosity of the aqueous phase, stabilizing the resin product by diluting or acidifying the aqueous phase, separating the immiscible solvent phase from the aqueous resin, and treating the solvent phase with caustic to convert epichlorohydrin by-products to epichlorohydrin.

Preferably, the solvent containing epichlorohydrin (epi) is recycled to the reaction.

In the principal version of this invention (referred to as the "straight-through" version), the solvent remains present during the reaction of the prepolymer with epichlorohydrin.

In the principal version, the upper temperature limit will be the lower of the reflux temperatures of the chosen solvent and about 85° C. The lower limit will be about 20° C., below which reaction times are impractically long. The preferred range will ordinarily be between about 50°C. and the lower of about 80° C. and the reflux temperature of the chosen solvent.

During the reaction, the epi partitions between the solvent and the water, and is gradually exhausted from the solvent as epi in the water phase reacts with the polyamide.

It is desirable to use longer reaction times to compensate for the slower reaction rate due to lower instantaneous concentration of epi in the aqueous phase, but this disadvantage is offset by the advantage that a one-stage solvent extraction of the product is accomplished in-situ, thus achieving a significant reduction of DCP content in the resin solution with minimal added cost.

The process according to the invention provides a cost-effective way to reduce the 1,3-dichloro-2-propanol and 2,3 -dichloro-1-propanol content in the manufacture of polyaminopolyamide-epichlorohydrin, by conducting the polyamide-epi reaction in a mixture of water and an immiscible solvent for the epi, instead of water alone.

A first alternative version of the invention, called the "interim-removal" version, includes the steps of removing the solvent by heating the combined and still-reacting prepolymer and epichlorohydrin solutions to distill off the solvent at a temperature below the reaction temperature before the desired viscosity of the aqueous phase is reached, continuing the reaction until the desired viscosity is reached, stabilizing the resin solution by diluting and/or acidifying the aqueous phase, and adding the solvent back to the aqueous phase after the resin is stabilized by dilution and/or acidification, to extract the epichlorohydrin reaction by-products at that stage. As the solvent is distilled off, the epi is transferred to the water phase for reaction with the polyamide. When the solvent is added back, the by-products are extracted and accumulate into the organic solvent, which is then separated from the aqueous resin solution for further treatment.

The separated solvent will contain the epi by-products 1,3 -dichloro-2-propanol ("1,3-DCP"), 2,3-dichloro-l-propanol ("2,3DCP"), and 3-chloro-1,2-propanediol ("CPDiol"), with traces of epi. The DCP can be reconverted to epi by treatment with a strong alkali such as sodium hydroxide, potassium hydroxide, calcium hydroxide, and the like. The solvent containing the epi so reclaimed can be saved and, after analysis to determine its epi content, recycled to a subsequent reaction batch. The solvent may however be separated from the epi by-products by distillation before the alkali treatment if desired, but it is preferred to convert the dissolved DCP and other by-products to dissolved epi for recycle.

A second alternative version of the invention, called the "melted-solvent" version, includes the steps of adding water to the solvent phase after it is separated from the aqueous resin and before or after it is treated with caustic, and cooling the solvent phase to its freezing point to extrude the epichlorohydrin reaction by-products, or reconverted by-product, respectively, from the frozen solvent. The epichlorohydrin product is then dissolved in water, and the epichlorohydrin content of the water is determined to prepare it for recycling to another reaction batch.

In both the straight-through and interim-removal versions, the traces of residual epi are normally removed from the spent caustic as an additional cost-saving step, and in all versions of the invention, the solvent is removed from the final stabilized aqueous resin solution by separating the solvent and aqueous layers. If desired, means known to the art, such as centrifuging and/or filtration, can be used to facilitate the separation.

An advantage of the melted-solvent version of the invention is that it eliminates the step of removing the traces of residual epi from spent caustic, by recycling the aqueous layer to the reactor. Of course, for economic reasons, relatively high-melting solvents would be used, preferably vegetable oil esters and those esters that are either on the FDA GRAS (Generally Recognized As Safe) list of permitted food additives or are otherwise permitted indirect food additives under FDA regulations.

If the high-melting solvent, such as the vegetable oil sub-class, presents a problem of saponification and emulsion problems or foamy resin, the step of cooling the solvent phase to its freezing point is preferably carried out before treating it with caustic. In any case, the products would be harmless or even on the GRAS list.

Preferably, in all versions of the invention, residual dissolved solvent in the separated resin solution is stripped for re-use, and in the second alternative process, the frozen solvent is separated from water and remelted for re-use.

DETAILED DESCRIPTION OF INVENTION

Conventional prepolymers for use in the process of the invention include poly(secondary amino)amides such as diethylenetriamine (DETA)-adipic acid, DETA-glutaric, DETA-itaconic, and DETA-adipic polyamides, and the like. Under conventional and appropriate reaction conditions, resins based on tertiary amino polymers such as poly(methyldiallylamine), or on polyamides, polyureas, or poly(amide-co-ureas) of methylbis(3-aminopropyl)amine ("MBAPA") may be used. Preferred is diethylenetriamine-adipic acid polyamide.

Preferably, the solvent for use in the principal version of the invention (as opposed to the alternative versions of the invention) should have a boiling point (at least as its water azeotrope) above the maximum temperature contemplated for the polymer-epichlorohydrin reaction. When solvent is present, the mixture cannot be heated above the boiling point of the solvent (as its water azeotrope). Low-boiling solvents can limit the maximum reaction temperature, resulting in undesirably long reaction times. The solvent preferably has a boiling point (at atmospheric pressure) not below about 60° C., and more preferably above about 75° C.

Preferably, the solvents used in this invention have these properties:

1. Favorable partition coefficient vs. water, for epi, DCPs, and CPdiol, to remove the maximum amount of the epi residuals per volume of solvent in the one pass extraction.

2. Lack of toxicity. The solvent residues remaining in the resin should not compromise operator safety nor the utility of the resin in food packaging.

3. Inert to the amine prepolymer under the reaction conditions, as well as to the final resin.

4. Having a density different from that of resin, for easy phase separation.

Solvents having these additional properties are more preferred:

5. Low water solubility in order to reduce the economic need to recover the solvent from extracted resin.

6. High flash point.

7. Inertness to caustic; to meet this criterion, solvents would be those that could be saponified only slowly, such as hindered ketones or hindered esters, into products which themselves meet criterion 2(a) and (b); the most preferred solvents would be completely inert, such as ethers.

8. Not readily emulsified in wet-strength resin solutions.

9. Inertness to hot dilute HCl, which may be a factor in acid-stabilized, base-reactivated resins like Kymene® 450 and 2064 resins.

In general, solvents for use in the invention, including alcohols, ethers, esters and ketones, are as follows:

* Alcohols of 5 to 12 carbon atoms: aliphatic, alicyclic, and aralkyl, such as straight- and branched-chain amyl alcohols, hexyl alcohol, straight and branched-chain octyl alcohols such as n-octanol, octanol-2, and 2-ethylhexanol, nonyl alcohol, decanol, undecanol, and dodecanol; cyclohexanol, 4-methylcyclohexanol, pineol, and borneol; 1- and 2-phenylethanols, etc. Preferred are $C_5$–$C_8$ aliphatic and alicyclic alcohols.

* Ethers containing 5 to about 12 carbon atoms, such as methyl n-butyl ether, methyl isobutyl ether, methyl n-amyl ether, methyl isoamyl ether, ethyl n-propyl ether, ethyl n-butyl ether, propyl n-butyl ether, dibutyl ether, dipentyl ether, dihexyl ether, anisole, veratrole, anethole, and the like. Preferred would be $C_5$ to about $C_8$ aliphatic ethers.

* Esters containing about 4 to about 10 total carbon atoms per carbalkoxyl group. These may be derived from saturated aliphatic, unsaturated aliphatic, alicyclic, and aromatic acids, and from saturated alkyl, unsaturated alkyl, alicyclic, or aralkyl alcohols. Included are monoesters of 4 to about 10 carbon atoms, diesters of 7 to about 20 carbon atoms, and triesters of 12 to about 30 carbon atoms.

Examples of monoesters include methyl butyrate, ethyl butyrate, propyl butyrate, isoamyl butyrate, hexyl butyrate, ethyl octanoate, isoamyl acetate, ethyl acetate, propyl acetate, isopropyl acetate, butyl acetate, 1-octyl acetate, 2-octyl acetate, cyclohexyl acetate, allyl heptanoate, cyclohexyl acetate, 2-phenylethyl acetate, methyl benzoate, ethyl benzoate, methyl cyclohexanecarboxylate, ethyl sorbate, and the like. Examples of diesters include dimethyl glutarate, dimethyl adipate, diethyl glutarate, diethyl adipate, dimethyl sebacate, diethyl sebacate, diethyl suberate, diethyl 1,4-cyclohexane-dicarboxylate, diethyl phthalate, dibutyl phthalate, dicyclohexyl adipate, and the like. Examples of triesters include tributyrin (glyceryl tributryate), tricaproin (glyceryl tricaproate), triethyl 1,2,3-propanetricarboxylate, triethyl citrate, and the like. Preferred are esters and diesters including aliphatic esters of 4–7 total carbon atoms per ester group. More preferred are mono esters of 4–7 carbon atoms.

* Orthoesters containing 8 to about 20 carbon atoms, including triethyl orthopropionate ("TEOP"), trimethyl orthovalerate, tripropyl orthoformate, triethyl orthodecanoate, triethyl orthobenzoate, and the like.

* Ketones containing about 5 to about 12 carbon atoms. These may be aliphatic, alicyclic, or aromatic. Examples include pentanone-3, methyl isopropyl ketone, methyl isobutyl ketone ("MIBK"), octanone-2, heptanone-4, cyclohexanone, 2-methyl-cyclohexanone, 4-methyl-cyclohexanone, carvone, acetophenone, and the like. Preferred are ketones having 6 to about 10 carbon atoms.

* Acetals containing about 8 to about 20 carbon atoms. These may be derived from saturated or unsaturated aliphatic aldehydes or aromatic aldehydes, and saturated, unsaturated, or aralkyl alcohols. Examples include butyraldehyde diethylacetal, n-hexyl aldehyde diethyl acetal, benzaldehyde dimethyl acetal, acetaldehyde dibutyl acetal, butyraldehyde diallyl acetal, acetaldehyde bis(2-phenylethyl) acetal and citral dimethyl acetal.

More preferred solvents include aliphatic and alicyclic esters of about 4 to about 7 carbon atoms, such as ethyl acetate, butyl acetate, amyl acetate and isoamyl acetate, ethyl butyrate, and methyl pivalate; aliphatic and alicyclic diesters of about 7 to about 14 carbon atoms, such as dimethyl glutarate, dimethyl adipate, and dibutyl adipate; aliphatic and alicyclic ketones of 6 to 10 carbon atoms such as methyl isobutyl ketone, octanone-2, and carvone; and orthoesters of 7 to 12 carbon atoms such as triethyl orthopropionate, tripropyl orthoformate, tripropyl orthoacetate, triethyl orthobutyrate, and trimethyl orthobenzoate.

The most preferred solvents are monoesters of 4 to 7 carbon atoms such as ethyl acetate, butylacetate, amyl acetate, isoamyl acetate, ethylbutyrate, methyl pivalate and the like, and aliphatic or alicyclic ketones of 6 to 8 carbon atoms such as methyl isobutyl ketone, cyclohexanone, octanone-2, and the like.

Mixtures of two or more solvents may be used if desired to change the proportions of various epichlorohydrin by-products removed.

In the first alternative version of the invention, the interim removal version, in which the solvent is distilled out and later returned, the preferred solvents have relatively low boiling points, since the aqueous reaction mixture phase will be at the boiling point of the solvent (as its water azeotrope), and much of the epi will be in the solvent phase, and gradually transfer to the water phase as the solvent is distilled off. If the reaction mixture is hot enough to allow the reaction to occur at a rate that results in an "epi-starved reaction" (in which a substantial part of the reaction occurs before a desirable level of epi has been made accessible to the aqueous polymer for reaction), the storage stability of the product will tend to be reduced, and can even cause the resin to gel in the reaction vessel.

A low-boiling solvent will allow the interim removal of solvent at temperatures low enough to limit the extent of "epi-starved reaction" before all of the epi has become accessible to the polymer. Preferably, the solvent has a boiling point below about 80° C. (at atmospheric pressure). Above this temperature, there will not be enough difference between the boiling point of the solvent and of the epi to prevent epi from being lost from the mixture by co-distillation. Using solvents with boiling points near 80° C. (atmospheric) would still generally require removal under reduced pressure, to limit the temperature and the extent of premature reaction. Preferred solvents will have boiling points (at atmospheric pressure) below about 60°C. and more preferably below about 50° C.

Solvents for use in the first alternative version of the invention, that have boiling points below about 80° C. include esters of 4 carbons, branched esters of 5 to 7 carbons, linear ethers of 4 to 5 carbons, and branched ethers of 5 to 6 carbons. Preferred examples are as follows:

Ethyl acetate, n-propyl formate, isopropyl formate, (di)ethyl ether, methyl n-propyl ether, ethyl n-propyl ether, methyl n-butyl ether, methyl isobutyl ether, methyl t-butyl ether (MTBE), and ethyl t-butyl ether. The more preferred solvents include (di)ethyl ether, and methyl t-butyl ether. Mixtures of two or more solvents may be used if desired.

The epichlorohydrin-based by-products will be removed more completely as the ratio of solvent to aqueous reaction mixture is increased. However, increasing this ratio will require using a larger reaction vessel per unit of resin produced in a given time. The weight ratio of organic solvent to aqueous reaction mixture can range between about 0.1 and about 10, preferably between about 0.2 and about 2.0, and more preferably between about 0.5 and about 1.5.

The procedures for carrying out the principal or straight-through version of the invention are as follows:

To a diluted aminopolyamide or other prepolymer, epichlorohydrin and the organic solvent are added. In the case of the initial batch of a series, all of the epichlorohydrin will be "fresh" i.e, not yet recycled The epi may be added as a solution in the solvent, or it may be added separately before, after, or concurrently with the solvent. In subsequent recycle batches, the solvent will contain epi, re-formed by caustic treatment of the extracted DCP from the previous batch. (Usually, this recycled epi will represent less than half of the total epi required for a batch).

Regardless of the fraction of the total epi represented by recycle material, the "fresh" epi may be also be added predissolved in the recycled solvent along with the recovered epi. It may also be added separately before, during, or after the addition of solvent plus recycled epi. It is necessary to let the mixture react until the alkylation reaction of the amine prepolymer with the epi is substantially complete, in order to realize the reduction of epi by-product content possible with this invention. This should occur before the cross-linking of the resin has proceeded to the solution viscosity target.

It may be desirable to stir the mixture with moderate warming (usually between about 25° C. and about 55° C.) until alkylation of the amino polymer by the epichlorohydrin is substantially complete, then to raise the temperature to between about 35° C. and about 80° C. to complete crosslinking. When the viscosity of the aqueous phase has reached a desired level, the resin can be stabilized for storage by dilution and/or acidification by means known to the art.

The procedure used for the examples of the "interim removal" version is modified as follows:

To a diluted aminopolyamide or other prepolymer, epichlorohydrin and the organic solvent are added. As in the case of the principal version of the invention, all of the epichlorohydrin will be "fresh" in an initial batch of a series. The epi may be added as a solution in the solvent, or it may be added separately before, after, or concurrently with the solvent. In subsequent recycle batches, the solvent will contain epi, re-formed by caustic treatment of the extracted DCP from the previous batch. (Usually, this recycled epi will represent less than half of the total required for a new batch.) The remainder will be made up with "fresh" epi. As soon as the solvent has been added, the mixture is heated to the boiling point of the mixture, and the solvent is allowed to distill out substantially completely. The fresh epi may be dissolved in the solvent along with the recycle epi. Alternatively, it may be added separately, before, or during the addition of the solvent and recycled epi. It may also be added immediately after the solvent has been added and distilled out. (Examples demonstrating both adding the fresh epi before the recycle solution, and after the recycle solvent has been distilled out are included below). In any case, it is preferred to distill out the solvent as soon as possible after it has been added.

Completing the alkylation step will ordinarily require less time in this version, because without solvent present, the reactable concentration of epi in the aqueous mixture will be higher. When the viscosity of the aqueous reaction mixture has reached a desired level, the resin can be stabilized for storage by dilution and/or acidification by means known to the art. The distilled solvent can then be added back to the resin and mixed long enough to reach partition equilibrium of epi by-products between the aqueous resin and the solvent.

In all cases, it is necessary to let the mixture react until the alkylation reaction of the amine prepolymer with the epi is substantially complete, in order to realize the maximum reduction of epi by-product content possible with this invention. This reaction should occur before the cross-linking of the resin has proceeded to the desired solution viscosity.

In all the modifications of the invention, the solvent is removed from the stabilized aqueous resin solution by separating the layers. If desired, means known to the art such as centrifuging and/or filtration can be used to aid the separation.

The organic phase contains the epi by-products 1,3-DCP, 2,3-DCP, CPdiol, and traces of epi. To reconvert the DCPs to epi, the organic phase can then be stirred with cold concentrated alkali. The alkali can be calcium hydroxide, sodium hydroxide or potassium hydroxide, the latter being preferred, in water at concentrations of about 10% to about 50% by weight. Temperatures may be in the range of 0° C. to about 20 ° C. Preferred conditions are use of NaOH in 30 to 50% solution, at 0° C. to 10° C.

Alternatively, the solvent can be separated from its contained DCPs and CPdiol by distillation, and the crude DCP converted to epi as above in the absence of solvent; however, there would not normally be an advantage in introducing this extra process step. Although solvent extraction depends on use of an immiscible solvent, the aqueous solution of resin will contain traces of dissolved solvent.

In order to avoid loss of material in the process and to avoid needless extraneous material in the resin product, it is desirable to recover the traces of dissolved solvent from the resin. This is done most readily by conventional co-distillation. On heating, preferably under reduced pressure, water and residual solvent will co-distill, forming two phases in the distillate. The distillation is carried out until the solvent is substantially completely removed; this is shown by the distillate becoming homogeneous. It is preferred to carry out this step while the diluted, quenched resin is cooling down. The heat of evaporation for the distilled water and solvent can be supplied by the latent heat from the warm resin solution, which minimizes the need for additional energy input from outside and minimizes the cycle time per batch of resin. The traces of solvent so distilled from the resin solution, can be readily separated from the co-distilled water and combined with the bulk of the solvent that was physically separated from the quenched resin.

Because the solvents preferred in the principal or straight-through version of the invention will have boiling points above about 75° C., to steam-distill out solvent at atmospheric pressure would involve heating the aqueous resin solution at relatively high temperatures. Since heating the resin solution can accelerate hydrolysis of the reactive functional groups and degrade the effectiveness of the resin, and/or cause premature gelation, co-distillation at atmospheric pressure will not ordinarily be preferred. It is generally preferred to co-distill out residual solvent at reduced pressure, to minimize heating of the resin.

In the interim removal version, using a low-boiling solvent such as an ether of 4 to 5 carbon atoms, the solvent will distill out at a temperature low enough that the risk of gelation or loss of reactivity will be relatively slight. In principle, it should be possible to distill out the traces of residual solvent at atmospheric pressure. However, it is also possible to use moderately reduced pressure, readily determined by experiment.

Control Experiments A, B, and C, without solvent, illustrate the prior art. Of these, Control B is a duplicate of Control A.

A solution of 25 g of a 1:1 diethylenetriamine-adipic acid polyamide in 160.25 g total water was treated with 10.86 g epichlorohydrin. The mixture was heated with stirring at 40° C. for 1 hour (in Controls A and B) or 3.5 hours (Control C), then heated to 65°–75° C. until the Gardner-Holdt viscosity (of a sample at 25° C.) was between E and F. Further crosslinking was quenched by adding 45.0 g dilution water, 2.6 g of 38% (10N) sulfuric acid, then 36.5 g additional dilution water, with concurrent cooling to 25° C. The pH was adjusted to 4.0 with additional 38% sulfuric acid.

TEST RESINS

EXAMPLES 1, 2, 3, 4, 5 and 6

A solution of 25 g of a 1:1 diethylenetriamine-adipic acid polyamide in 160.25 g total water was treated with a preformed solution of 2.2 g epichlorohydrin in the following weight of solvent:

Examples 1 and 4: 44.1 g methyl isobutyl ketone

Example 2: 48.4 g butyl acetate

Example 3: 160 g citral dimethyl acetal

Example 5: 48.3 g ethyl butyrate

Example 6: 144.9 g ethyl butyrate

After 5 minutes, 8.66 g epichlorohydrin was added to the mixture, which was then heated with vigorous stirring to 40° C. and held there for 1 hr or 3.5 hr (as indicated in Table 4). The mixture was then heated to 65°–70° C. and allowed to crosslink to a Gardner-Holdt viscosity of approximately E. Viscosity samples from the aqueous layer were withdrawn after 1–2 minutes without stirring to allow the layers to separate. At the target viscosity, further crosslinking was arrested by adding 45 g water, 2.6 g 38% sulfuric acid, and 36.5 g additional water, concurrently cooling to 25° C. The pH was then adjusted to 4.0 with additional acid if necessary. The aqueous resin solution was then separated from the organic layer in a separatory funnel.

Examples 1–6 illustrate the principal (straight-through version). Examples 4–6 show the use of a longer reaction time than in Examples 1–3, to compensate for the lower instantaneous concentration of epichlorohydrin in the aqueous phase. Examples 7, 8, 9, and 10 illustrate the principal ("straight-through") method of extraction of epichlorohydrin by-products from an initial batch of resin (Examples 7 and 9), their reconversion in solution to epichlorohydrin, and recycle to a second resin batch (Examples 8 and 10). [Two solvents are demonstrated: methyl isobutyl ketone in Examples 7 and 8, and triethyl orthopropionate in Examples 9 and 10.]

EXAMPLE 7

Approximately a 50% solution of 1:1 diethylenetriamineadipic polyamide was diluted with additional water to provide a solution containing 45.0 parts polyamide solids and 288.45 parts total water. A previously prepared solution of 4.0 g epichlorohydrin in 288 parts methyl isobutyl ketone was added to the polyamide solution, followed by 15.55 parts additional epichlorohydrin. The mixture was heated with stirring at 45° C. for 4 hours, then heated to 65°–70° C.

and crosslinked to a Gardner viscosity approximately D to E (sample of the aqueous layer at 25° C.). The resin solution was quenched by adding 4.63 parts 38% (10N) sulfuric acid, and 81 parts water over ca. 5 minutes with cooling to 40° C. Additional water (65.7 parts) was then added, and the mixture was cooled to 25° C. and adjusted to pH 4.0. The aqueous resin was separated from the organic layer, and diluted with half its weight of water from ca. 12.5% to ca. 8.3% resin solids content. The aqueous resin was then subjected to vacuum of ca. 40–50 mm Hg, and heated until the cloudy distillate became clear. The distillate was separated, and the organic layer was combined with the main organic layer from the resin. An analytical sample of the combined organic layers was saved. The remaining organic solution was stirred vigorously with 0.1 volume of cold 30% (10N) aqueous NaOH for 0.5 hour to convert DCP to epichlorohydrin, separated, and washed twice with between 0.05 and 0.1 times its volume of water. A sample was saved for analysis by gas chromatography (GC), to determine its content of recovered epichlorohydrin.

EXAMPLE 8

A solution of 25 parts of DETA-adipic polyamide in 160.25 parts of water was treated with 160 g of the (caustic-treated) organic solution of recovered epi. Enough additional epi was added to total 10.86 parts (sum of epi in organic phase, as analyzed,+fresh material). As in the original batch, the mixture was stirred for 4 hr at 45° C. then heated to 60°–65° C. with stirring until the aqueous phase had thickened to Gardner-Holdt viscosity of ca. D to E (sample at 25° C.). The crosslinking reaction was arrested by adding 2.6 parts of 38% (10 N) sulfuric acid and starting the addition of 45 parts of water over 5 minutes, with cooling. At 40° C., the mixture was further diluted with 36.5 of parts water and cooled to 25° C. After separating the layers, the aqueous resin solution was vacuum-stripped. The organic solvent portion of the distillate was combined with the main organic solvent fraction separated from the resin.

EXAMPLE 9

Example 9 was carried out like Example 7, except that the 288 parts of methyl isobutyl ketone was replaced by 288 parts of triethylorthopropionate.

EXAMPLE 10

Example 10 was carried out like Example 8, except that the 160 parts of (caustic-treated) organic solution of recovered epi from Example 7 was replaced by 160 parts of the (caustic-treated) organic solution of recovered epi from Example 9.

Examples 11 through 14 illustrate the "interim removal" version of this invention. Examples 11 and 13 describe initial batches of resin and the conversion of their extracted epi by-products to epichlorohydrin. Examples 12 and 14 describe recycle batches that utilize the recovered epichlorohydrin. These Examples illustrate the operating latitude of adding the fresh epichlorohydrin to the prepolymer solution either before (Examples 11, 12) or after (Examples 13, 14) distilling out the solvent that carried the recycled epi.

Interim-Removal Version (Examples 11–14)

EXAMPLE 11

A ca. 50% solution of 1:1 diethylenetriamine-adipic polyamide was diluted with additional water to provide a solution containing 45.0 parts of polyamide solids and 288.45 parts of water. A previously prepared solution of 4.0 parts of epichlorohydrin in 288 parts of t-butyl methyl ether was added to the polyamide solution with stirring, and the mixture was heated to the boiling point of solvent (ca. 50° C.) until the ether was substantially completely removed. Additional epichlorohydrin (15.55 parts) was also added to the mixture before the ether was distilled out. The mixture was then heated with stirring at 45° C. for 1 hour, then heated to 65°–70° C. and crosslinked to a Gardner viscosity approximately D to E (sample of the aqueous layer at 25° C.).

The resin solution was quenched by adding 4.63 parts of 38% (10N) sulfuric acid, and 81 parts of water over about 5 minutes with cooling to 40° C. Additional water (65.7 parts) was then added, and the mixture was cooled to 25° C. and adjusted to pH 4.0. The t-butyl methyl ether previously distilled from the reaction mixture was added back (with make-up material to make a total of 288 parts of the ether), and stirred vigorously for 5 minutes. The aqueous resin solution was separated from the ether layer, which was analyzed for epi and DCP content. The ether layer was then stirred vigorously for 0.5 hr with 0.10 times its volume of 10N (30%) aqueous NaOH to convert DCP to epichlorohydrin, washed twice with 0.05–0.10-volume portions of water, and analyzed for epichlorohydrin content.

EXAMPLE 12

A solution of 25.0 g of DETA-adipic polyamide in 160.25 g of water was treated with 160 g of the (caustic-treated) t-butyl methyl ether solution of recovered epichlorohydrin from Example 11. The reaction mixture was then heated to distill out substantially all of the ether. Enough additional epichlorohydrin was added to total 10.86 parts (sum of epi in organic phase, as analyzed,+fresh material). The additional epichlorohydrin was added before distilling out the ether. As in the original batch, the mixture was stirred for 1 hour at 45° C., then heated to 65°–70° C. with stirring until the aqueous phase had thickened to Gardner-Holdt viscosity of ca. D to E (sample at 25° C.). The crosslinking reaction was arrested by adding 2.6 parts 38% (10N) sulfuric acid and starting the addition of 45 parts water over 5 minutes with cooling. At 40° C., the mixture was further diluted with 36.5 parts of water and cooled to 25° C. The earlier-distilled t-butyl methyl ether was added back (with additional material to make a total of 160 parts of the ether), stirred vigorously with the resin solution for 5 minutes and separated.

EXAMPLE 13

Example 13 was carried out like Example 11, except that the 15.55 parts of additional epichlorohydrin was added after the t-butyl methyl ether was distilled out.

EXAMPLE 14

Example 14 was carried out like Example 12, except that the additional epichlorohydrin (sufficient to give 10.86 parts of total epi) was added after the t-butyl methyl ether was distilled out.

EXAMPLE 15

Example 15 was carried out like Example 11, except that the mixture was heated approximately 4 hours of approximately 50° C. under reflux before distilling out the ether.

Alternative Interim Solvent Removal: Low-Melting Solvent

EXAMPLE 16

A solution of 25 parts of a 1:1 DETA-adipic acid polyamide in 160.25 parts of water is treated with 10.86 parts of epichloro-hydrin and 160 parts of poly(caprolactone)triol of an average molecular weight of about 900 daltons, having a melting point about 30° C. The mixture is heated with stirring at 40° C. for about 5 hours, then at about 60° to 65° C. until the Gardner-Holdt viscosity of the aqueous layer is above D. The resin is then diluted with about 81.5 g water and adjusted to pH 4.0 with sulfuric acid. While the temperature of the resin solution is above about 35° C., the organic layer is separated from it.

The organic layer is then mixed with about 10% to about 25% its weight of water and chilled to solidify the poly(caprolactone)-triol, thereby extruding its dissolved epichlorohydrin by-products into the water layer. The resulting water solution of these by-products can then be treated with sodium hydroxide, a known method to convert dichloropropanols back to epichlorohydrin. The resulting aqueous solution of crude recovered epichlorohydrin is then assayed by gas chromatography for epichlorohydrin content, and recycled to a subsequent batch of resin as part of the epichlorohydrin and water charge.

Table 1 shows the results of analyses for epichlorohydrin and its by-products in the resins of this invention.

On a Noble-Wood handsheet machine, handsheets were made from 50/50 hardwood/softwood bleached kraft pulp, beaten to ca. 500 mL Canadian standard freeness in water at 100 ppm Ca hardness, 50 ppm alkalinity and treated with 0.5% resin (solids, based on pulp solids). Handsheets were made at 65 g/sq m basis weight, and dried on a laboratory drum dryer. Tensile tests were run after 2 weeks natural aging (23 deg C., 50% RH). Table 2 shows the utility of the examples as wet-strength resins. The data cited include tensile strengths, elongation at failure, and tensile energy absorptions (TEA).

TABLE 1

EPICHLOROHYDRIN BYPRODUCTS IN DETA-ADIPIC POLYAMIDE-EPICHLOROHYDRIN RESINS MADE WITH 'IN-SITU' SOLVENT EXTRACTION

| | | | Low Temp. | "Epi Residuals", %, Calculated On 100% Resin Solids Basis | | | |
|---|---|---|---|---|---|---|---|
| Design | Solvent | Cycle | Hold Time | Epi | 1,3-DCP | 2,3-DCP | CP-diol |
| Control A | None | — | 1 h | <0.1 | 2.4 | <0.1 | 0.9 |
| Ex. 1 | MIBK (0.2 v) | 1 | 1 h | 1.5 | 2.0 | n.d. | n.d. |
| Ex. 2 | Butyl Acetate (0.2 v) | 1 | 1 h | 0.7 | 1.0 | <0.1 | 0.7 |
| Ex. 3 | Citral dimethyl acetal (0.6 v) | 1 | 1 h | <0.1 | 0.4 | <0.1 | 0.4 |
| Control C | None | 1 | 3.5 h | <0.1 | 2.3 | <0.1 | 1.2 |
| Ex. 4 | MIBK (0.2 v) | 1 | 3.5 h | <0.1 | 2.1 | <0.1 | 1.1 |
| Ex. 5 | Ethyl butyrate (0.2 vol) | 1 | 3.5 h | 0.2 | 1.8 | <0.1 | 1.1 |
| Ex. 6 | Ethyl butyrate (0.6 vol) | 1 | 3.5 h | 0.6 | 0.6 | <0.1 | 0.5 |
| Control B | None (Control) | 1 | 1 h | <0.1 | 2.2 | <0.1 | 0.7 |
| Ex. 7 | MIBK | 1 | 1 h | 0.5 | 0.6 | <0.1 | <0.1 |
| Ex. 8 | MIBK | 2 | 1 h | <0.2 | 0.4 | <0.2 | <0.2 |
| Ex. 9 | TEOP | 1 | 1 h | <0.1 | 0.6 | <0.1 | 0.5 |
| Ex. 10 | TEOP | 2 | 1 h | <0.1 | 0.3 | <0.1 | 0.3 |
| Ex. 11 | MTBE[a] | 1 | 1 h | 0.4 | 0.7 | <0.1 | 0.6 |
| Ex. 12 | MTBE[a] | 2 | 1 h | <0.1 | 0.8 | <0.1 | 0.6 |
| Ex. 13 | MTBE[b] | 1 | 1 h | 0.2 | 0.6 | <0.1 | 0.24 |
| Ex. 14 | MTBE[b] | 2 | 1 h | <0.1 | 0.4 | <0.1 | 1.0 |
| Ex. 15 | MTBE[c] | 1 | 4 h | <0.1 | 3.1 | 0.3 | 0.9 |

[a]Fresh epi added before distilling solvent.
[b]Fresh epi added after distilling solvent.
[c]Fresh epi added and mixture heated approx. 4 hrs. before distilling solvent.

TABLE 2

HANDSHEET WET-STRENGTH EVALUATIONS OF "IN-SITU EXTRACTED" POLYAMIDE-EPICHLOROHYDRIN RESINS

| | | | Breaking Length: km | | % | Elongation % | | T.E.A. J/g | |
|---|---|---|---|---|---|---|---|---|---|
| Design | Solvent | Cycle | Dry | Wet | W/D | Dry | Wet | Dry | Wet |
| Control B | None (Control) | — | 5.60 | 1.15 | 20.6 | 2.73 | 4.89 | 1.00 | 0.32 |
| Ex. 1 | MIBK | 1 | 6.03 | 0.95 | 15.8 | 2.70 | 4.47 | 1.08 | 0.26 |
| Ex. 3 | Citral-dimethyl acetal | 1 | 5.50 | 0.96 | 17.4 | 2.83 | 4.65 | 1.03 | 0.26 |
| Control C | None (Control) | 1 | 6.07 | 1.09 | 18.0 | 2.72 | 4.98 | 1.09 | 0.25 |
| Ex. 6 | Ethyl butyrate | 1 | 5.91 | 0.95 | 16.1 | 2.71 | 4.45 | 1.07 | 0.25 |
| Ex. 7 | MIBK | 1 | 5.58 | 0.95 | 17.1 | 2.96 | 5.20 | 1.10 | 0.29 |
| Ex. 8 | MIBK | 2 | 5.49 | 0.97 | 17.7 | 2.83 | 4.84 | 1.03 | 0.28 |
| Ex. 9 | TEOP | 1 | 5.73 | 1.03 | 18.0 | 3.00 | 4.76 | 1.13 | 0.28 |
| Ex. 10 | TEOP | 2 | 5.49 | 1.01 | 18.5 | 2.83 | 4.96 | 1.01 | 0.30 |
| Ex. 11 | MTBE[a] | 1 | 5.92 | 1.13 | 19.0 | 3.02 | 4.98 | 1.16 | 0.33 |
| Ex. 12 | MTBE[a] | 2 | 6.11 | 1.16 | 19.0 | 2.97 | 5.12 | 1.29 | 0.35 |
| Ex. 13 | MTBE[b] | 1 | 5.79 | 1.10 | 19.1 | 3.03 | 4.96 | 1.13 | 0.31 |
| Ex. 14 | MTBE[b] | 2 | 5.94 | 1.15 | 19.5 | 2.98 | 5.02 | 1.15 | 0.34 |
| Ex. 15 | MTBE[c] | 1 | 5.65 | 1.06 | 18.8 | 2.98 | 4.93 | 1.10 | 0.30 |

[a]Fresh epi added before distilling solvent.
[b]Fresh epi added after distilling solvent.
[c]Fresh epi added and mixture heated approx. 4 hrs. before distilling solvent.

I claim:

1. A process for reducing the concentration of epichlorohydrin by-products in the manufacture of polyamide-epichlorohydrin resins, comprising reacting polyaminopolyamide prepolymer in aqueous solution with epichlorohydrin, in the presence of a water-immiscible solvent for the epichlorohydrin, continuing the reaction of the prepolymer with the epichlorohydrin to produce the desired viscosity of the aqueous phase, stabilizing the resin product by diluting or acidifying the aqueous phase, separating the solvent from the aqueous resin, and treating the solvent phase with caustic to convert epichlorohydrin by-products to epichlorohydrin, wherein the weight ratio of organic solvent to aqueous reaction mixture is between about 0.1 and about 10, and wherein the lower limit of the temperature range over which the process is carried out is about 20° C. and the upper limit is the lower of the reflux temperature of the water-immiscible solvent and 85° C.

2. A process for reducing the concentration of epichlorohydrin by-products as claimed in claim 1, in which the epichlorohydrin content of the solvent containing converted epichlorohydrin is determined and the solvent is recycled in a repetition of the reaction step.

3. A process for reducing the concentration of epichlorohydrin by-products as claimed in claim 1, which includes the steps of removing the solvent by heating the combined and reacting prepolymer and epichlorohydrin solutions to distill off the solvent before the desired viscosity of the aqueous phase is reached, and adding it back to the aqueous phase after the resin is stabilized to extract the epichlorohydrin reaction by-products at that stage.

4. A process for reducing the concentration of epichlorohydrin by-products as claimed in claim 1, which includes the steps of adding water to the solvent layer after it is separated from the aqueous resin solution, heating the solvent layer with caustic either before or after the addition of water, and cooling the solvent phase to its freezing point to extrude the epichlorohydrin reaction by-product or converted by-product, respectively, from the frozen solvent, and to dissolve the epichlorohydrin product in water.

5. A process for reducing the concentration of epichlorohydrin by-products as claimed in claim 4, in which the step of cooling the solvent phase to its freezing point is carried out before treating it with caustic.

6. A process for reducing the concentration of epichlorohydrin by-products as claimed in claim 5, in which the frozen solvent is separated from water and remelted for re-use.

7. A process for reducing the concentration of epichlorohydrin by-products as claimed in claim 4, which includes the step of determining the epichlorohydrin content of the water in which it is dissolved, for recycling to the reaction.

8. A process for reducing the concentration of epichlorohydrin by-products as claimed in claim 1, in which the weight ratio of organic solvent to aqueous reaction mixture is between about 0.1 and about 10.

9. A process for reducing the concentration of epichlorohydrin by-products as claimed in claim 8, in which the weight ratio of organic solvent to aqueous reaction mixture is between about 0.2 and about 2.0.

10. A process for reducing the concentration of epichlorohydrin by-products as claimed in claim 9, in which the weight ratio of organic solvent to aqueous reaction mixture is between about 0.5 and about 1.5.

11. A process for reducing the concentration of epichlorohydrin by-products as claimed in claim 1, in which the boiling point of the solvent at atmospheric pressure is not below about 60° C.

12. A process for reducing the concentration of epichlorohydrin by-products as claimed in claim 1, in which the boiling point of the solvent is above about 75° C.

13. A process for reducing the concentration of epichlorohydrin by-products as claimed in claim 1, in which the solvent is a monoester having 4 to 7 carbon atoms.

14. A process for reducing the concentration of epichlorohydrin by-products as claimed in claim 3, in which the boiling point of the solvent at atmospheric pressure is below about 80° C.

15. A process for reducing the concentration of epichlorohydrin by-products as claimed in claim 14, in which the boiling point of the solvent at atmospheric pressure is below about 60° C.

16. A process for reducing the concentration of epichlorohydrin by-products as claimed in claim 15, in which the boiling point of the solvent at atmospheric pressure is below about 50° C.

17. A process for reducing the concentration of epichlorohydrin by-products as claimed in claim 13, in which the solvent is ethyl acetate.

18. A process for reducing the concentration of epichlorohydrin by-products as claimed in claim 13, in which the solvent is ethylbutyrate.

19. A process for reducing the concentration of epichlorohydrin by-products as claimed in claim 1, in which the solvent is an ether having 5 to about 12 carbon atoms.

20. A process for reducing the concentration of epichlorohydrin by-products as claimed in claim 19, in which the solvent is t-butyl methyl ether.

21. A process for reducing the concentration of epichlorohydrin by-products as claimed in claim 1, in which the polyaminopolyamide prepolymer is diethylenetriamine-adipic acid polyamide.

* * * * *